United States Patent [19]

Huffman et al.

[11] 4,218,881
[45] Aug. 26, 1980

[54] BELT CONVEYOR DRIVE SYSTEM

[76] Inventors: Robert P. Huffman, Star Route, Kegley, W. Va. 24731; Jesse Thomas, P.O. Box 269, Princton, W. Va. 24740

[21] Appl. No.: 36,319

[22] Filed: May 7, 1979

[51] Int. Cl.³ ............................................. F15B 15/18
[52] U.S. Cl. ...................................... 60/325; 60/494; 74/11; 198/807; 299/18
[58] Field of Search .................... 74/11, 221; 198/813, 198/782, 788, 789, 804, 807; 299/18; 60/494, 487

[56] References Cited

U.S. PATENT DOCUMENTS

| 280,247 | 6/1883 | See | 60/494 |
|---|---|---|---|
| 4,041,785 | 8/1977 | Roark | 74/11 |
| 4,133,581 | 1/1979 | Satterwhite | 299/18 X |

*Primary Examiner*—Edgar W. Geoghegan
*Attorney, Agent, or Firm*—Wilmer Mechlin

[57] ABSTRACT

A system for mechanically or hydraulically driving or powering equipment in underground mines off an advance flight of a belt conveyor, in which an assembly of a spaced and drivably connected drive roller and pump and a common base is releasably mountable on wire ropes or other supporting members at opposite sides of the conveyor for selective positioning longitudinally of the conveyor beneath the conveyor belt's advance flight and is vertically adjustable relative to the advance flight for adjusting the driving engagement of the drive roller with that flight for either continuous or intermittent drive of the drive roller and pump while the belt is running.

12 Claims, 6 Drawing Figures

BELT CONVEYOR DRIVE SYSTEM

BACKGROUND OF THE INVENTION

In modern underground mines for mining coal or other solid materials, the general practice is to carry the mined material from working areas to the surface on belt conveyors, usually with a main or mother conveyor leading along a main shaft to the surface and satellite or feeder conveyors leading from working areas and discharging directly or, through one or more intervening conveyors, indirectly onto the main conveyor, depending on their proximity thereto.

Electric lines and equipment for supplying and using electric power in underground coal mines, are subject to approval and periodic inspection under regulations of the Bureau of Mines designed particularly to safeguard against hazards, such as fire and explosion, attendant the exposure of such lines and equipment to coal dust, and are correspondingly expensive both in initial cost and maintenance. Despite the expense and potential hazards, it nonetheless is the practice in modern coal mines to make electric power available underground and drive by electric motors not only the drive pulleys of the belt conveyors but also auxiliary equipment required in the mine, such as pumps for draining water from puddles or pools accumulated in depressions in shaft floors, rock dusters for mixing pulverized limestone dust with the air to control coal dust generated in the working areas and along the conveyors, and tools of various types.

Recognizing shortcomings of using electric power in underground mines, Roark, in U.S. Pat. No. 4,041,785, issued Aug. 16, 1977, proposes to operate auxiliary equipment, such as pumps, mechanically by taking power off the return flight of one of the belt conveyors in the mine. In Roark's arrangement, a pair of drive rollers, drivably connected and normally spaced below the return flight of the conveyor belt, are forced into driving engagement with the return flight by a pressure roller positioned between the drive rollers on the opposite side of the belt and swingably mounted and manually positionable for disengaging the return flight from or varying its pressure on the pair of drive or, as termed by Roark, "drivable" rollers. Resembling Roark in replacing electric power by power taken off a belt conveyor, the present invention is particularly directed to an improved system for powering auxiliary equipment by a conveyor belt in which power is taken off the belt's advance flight.

SUMMARY OF THE INVENTION

The primary object of the present invention is to provide an improved belt conveyor drive system for underground mines whereby power can be taken off an advance flight of a conveyor belt at any selected position along the conveyor by a take-off pulley drivably engageable with and adjustable in height relative to an underside of the advance flight for taking off power either continuously or intermittently while the belt is running.

Another object of the invention is to provide an improved belt conveyor drive system for underground mines wherein a pump and a take-off roller drivably connected to the pump are mounted on and spaced along a common base and form therewith a pump assembly insertible between advance and return flights of a belt of a belt conveyor in selected positions longitudinally of the conveyor, the base is releasably mounted on and vertically adjustable relative to the side support members of the conveyor with the take-off roller centered laterally on the belt and the pump on a side of the conveyor and the pump may either be a pump for pumping accumulated water from depressions in a shaft floor or a drive pump for a hydraulic motor fluid-connected thereto and adapted to drive in-mine equipment.

A further object of the invention is to provide an improved belt conveyor drive system for underground mines of the character described in the immediately preceding object, wherein the advance flight of the conveyor belt rides on longitudinally spaced troughing idler pulley assemblies supported on and longitudinally spaced along the conveyor's side support members, the pump assembly is mountable between any adjoining pair of the troughing assemblies, and the vertical adjustability of the pump assembly base relative to the side support members enables the take-off roller of the pump assembly to be adjusted correspondingly relative to the belt's advance flight for controlling the driving engagement between the take-off pulley and advance flight and determining whether, while the belt is running, the take-off pulley and pump are driven continuously or only when the belt is loaded.

Another object of the invention is to provide an improved conveyor drive system of the character described in the last of the preceding objects, wherein the height of the take-off roller relative to the belt's advance flight is so adjusted that the take-off pulley is drivably engaged by the belt only when the belt is loaded, thus enabling a pump of the pump assembly in a form suitable for pumping accumulated water from a shaft floor to discharge the water onto the belt's advance flight for removal thereby with the mined material thereon.

Other objects and advantages of the present invention will appear hereafter in the detailed description, be particularly pointed out in the appended claims, and be illustrated in the accompanying drawings, in which:

FIGURE DESCRIPTION

DETAILED DESCRIPTION

Figure 1:
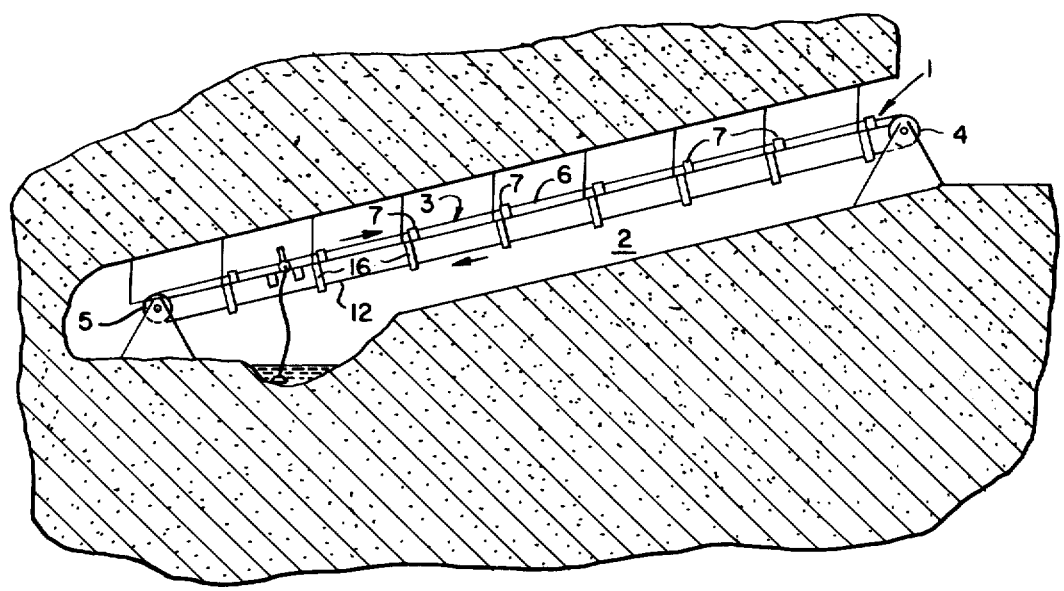
FIG. 1 is a schematic side elevational view of the improved drive system of the present invention showing a typical underground mine belt conveyor installed in a mine shaft and mounting a pump assembly driven off the belt's advance flight and in use for draining a puddle of water accumulated on the floor of the mine shaft.
Figure 2:
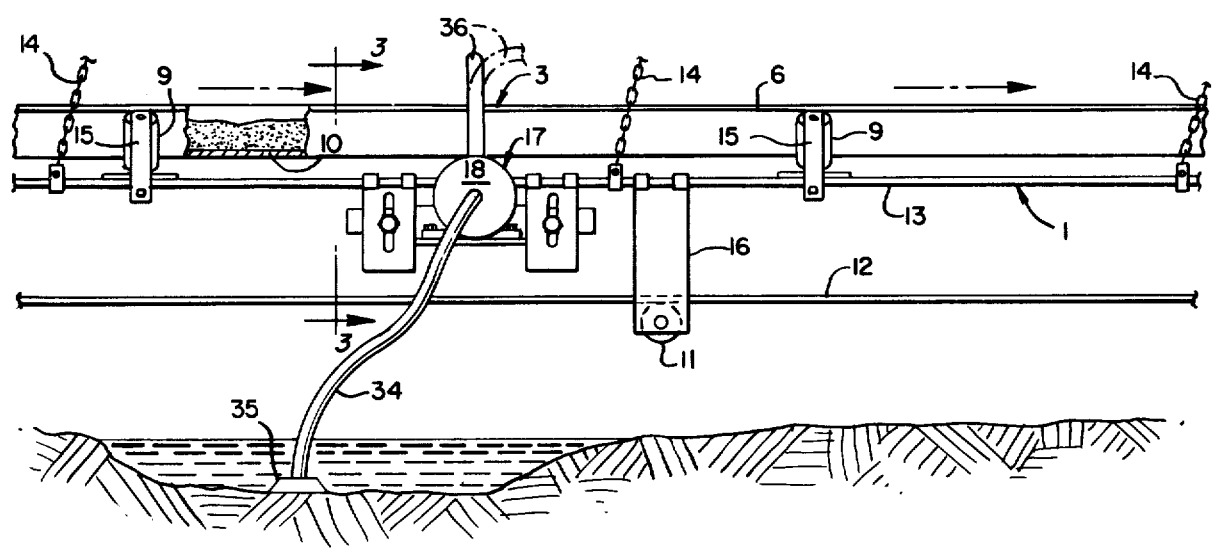
FIG. 2 is a fragmentary side elevational view on an enlarged scale, taken substantially in the plane of the supporting wire ropes and partly broken away, showing the part of the conveyor of FIG. 1 containing the pump assembly and associated structure.
Figure 3:
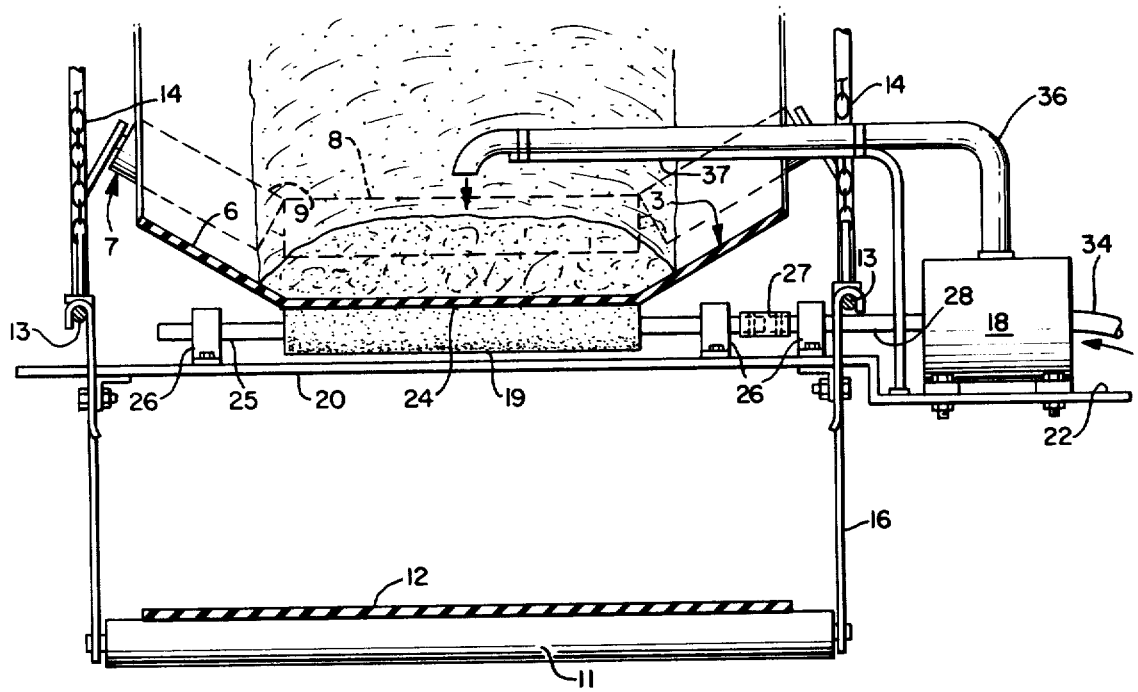
FIG. 3 is a vertical sectional view on a further enlarged scale taken along lines 3—3 of FIG. 2.
Figure 4:
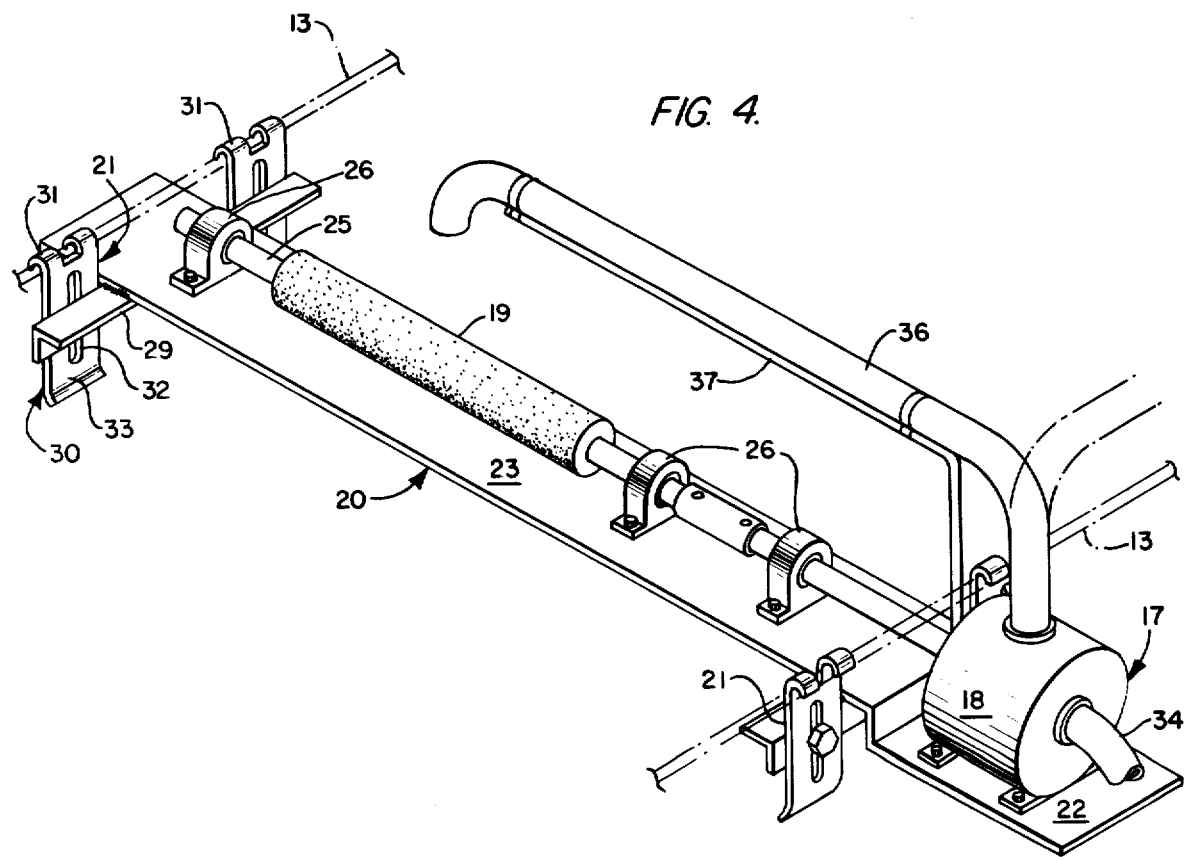
FIG. 4 is an isometric view of the pump assembly of FIG. 3 and on the same scale.

Referring now in detail to the drawings in which like reference characters designate like parts, the improved belt conveyor drive system of the present invention enables equipment in an underground mine to be driven or powered mechanically or hydraulically, instead of electrically, by power taken off an advance flight of an endless belt of a belt conveyor. Adapted generally for use in underground mines in which mined solid materials are transported to the surface by belt conveyors, the improved system is designed particularly for use in underground mines, such as coal mines, in which the use of electrical power is hazardous, and will be so described as exemplary of the invention.

As previously pointed out, in a modern coal mine using belt conveyors for transporting mined coal to the surface, there usually are at least one main or mother conveyor leading to and discharging on the surface and several satellites or feed conveyors leading from working areas in which coal is being dug for feeding or transporting mined coal therefrom either directly or, through one or more intervening conveyors, indirectly to the main conveyor, depending on their proximity thereto. Although the main and feed conveyors are differently named and of capacities and lengths suited to their individual tasks, the several conveyors are substantially identical structurally and typified in that respect by the main conveyor designated as 1 and illustrated somewhat schematically in FIG. 1.

Leading along a main shaft 2 to a surface area outside the mine on which it discharges the mined coal for further handling, the illustrated main conveyor 1 has an endless belt 3 riding or turning at upper and lower ends of the conveyor on head or upper and tail, foot or lower rollers or pulleys 4 and 5, respectively, of which the head roller usually is the drive roller and the tail roller an idler. Since located outside the mine, the head roller 4 of the illustrated main conveyor 1, can and usually will be driven by an electric motor drive (not shown) without the hazards, such as fire and explosion, attendant the supply and use of electric power inside the mine. Between the head and tail rollers 4 and 5, the advance, or material-transporting or carrying flight 6 of the belt 3 rides on a series of longitudinally spaced parallel idler pulley assemblies 7, which, for increased capacity, usually are three-pulley troughing idlers, each having a horizontal bottom pulley 8 and side pulleys 9 sloping or inclined upwardly and outwardly from the bottom pulley. Constantly engaging the sides of the belt 3, the side pulleys 9 of the several troughing assemblies 7 will form a central trough 10 in the belt even when the latter is empty and the trough will be deeper and have its bottom engaged by and supported on the bottom rollers 8 when the belt is loaded. By contrast, the conveyor's series of lower rollers 11 on which the return flight 12 of the belt 3 is supported or rides, are longitudinally spaced parallel straight idler pulleys or rollers.

The illustrated conveyor 1 has at opposite ends of the belt side supports or members 13, now usually in the form of a pair of wire ropes or cables extending substantially the length of the conveyor and each anchored at opposite ends to support structures for the head and tail rollers 4 and 5 and therebetween supported, usually at 12 foot intervals, either on stanchions or posts upstanding from the floor of the shaft 2 or, as illustrated, on chains 14 anchored to and suspended from the shaft's ceiling. For relatively long conveyors, the intermediate supports 14 usually are augmented, suitably at 100 foot intervals, by flange-reinforced or otherwise structured stronger supports (not shown), either resting on the floor or suspended from the ceiling of the shaft. If the side cables 13 are supported on stanchions, the same stanchions may support the straight idler rollers 11 for the return flight 12. However, when, as illustrated, the wire ropes 13 are suspended from the shaft's ceiling on the chains 14, both the advance flight troughing pulley assemblies 7 and return flight rollers 11, ordinarily will have their mounting frames 15 and 16, respectively, mounted or supported at opposite ends on and clamped or otherwise secured to the side wire ropes.

The power required to operate a belt conveyor can be substantially reduced if, as usually preferred, the shafts of the several rollers are journalled in antifriction bearings but in any case more torque is required for starting a belt conveyor than when the belt is running at full speed. Thus, the single or plural-motor, electric motor or other drive (not shown) for the head roller 4, must be sufficiently powerful to supply the starting torque required for the particular belt and its excess power when the belt is running is available for other purposes, even though not so utilized in a mine in which equipment inside the mine is electrically powered and the belt 3 of any belt conveyor 1 serves only to carry or transport mined material.

Powered or driven off the advance flight 6 of the belt 3 of a belt conveyor 1, such as above described, the improved drive system of the present invention is comprised, in combination with the conveyor, of a pump assembly 17 including a pump 18, a power take-off or drive idler roller or pulley 19 spaced from and drivably connected to the pump and a common mounting or base or mounting plate 20 mounting both the pump and the drive roller.

Insertible from a side between the advance and return flights 6 and 12 of the belt 3 at any selected position along the length of the conveyor 1 suitable for the operation it is intended to perform, the pump assembly 17 is mountable below the advance flight with its base plate 20 spanning and extending transversely across and supported by the side wire ropes 13. For releasably attaching or securing the assembly 17 to the wire ropes 13, the base plate 20 carries, mounts or has attached or secured thereto a pair of connectors 21 spaced longitudinally thereof and transversely or laterally of the side cables 13 in correspondence with the lateral spacing of the wire ropes, so that each, when the assembly is in operative position, is positioned to engage and attach, connect or clamp to the adjoining of the wire ropes. Of the illustrated flat or other shape suitable for mounting the pump 18 and drive roller 19, the base plate 20 in the operative or conveyor-mounted position of the pump assembly 17, is longitudinally elongated and of a length to extend between or beyond the wire ropes 13 so as to mount the pump 18 outwardly of or beyond the drive roller 19, suitably on a seat, platform or step 22 integral or rigid with and vertically offset from the base plate's main part 23 mounting the drive roller and extending between wire ropes. Mounted on the main part 23 between the connectors 21 in position to underlie and be centered laterally on the advance flight 6 of the belt 3 and preferably rubber or otherwise friction coated for antislip engagement with the under or inner side 24 of that flight, the drive roller 19 has its shaft 25 mounted or journalled towards opposite ends in preferably antifriction bearings or bearing blocks 26 mounted on and upstanding from the base plate 20. When mounted in operative position on the conveyor 1, the pump assembly 17 as a whole and the drive roller 19 are disposed at right angles or normal or perpendicular to the belt 3 and cables 13, with the drive roller substantially horizontal and parallel to the bottom pulleys 8 of the troughing pulley assemblies 7, except those of any self-aligning assemblies when swivelled out of their normal position at right angles to the belt.

With the pump 18 and drive roller 19 drivably connected, the pump will be driven whenever the drive roller is drivably engaged by the belt 3 and a driving connection, such as gearing, chain-and-sprocket or V-belt-and-pulley, is suitable, if, depending on its type and purpose, the pump is to be driven or rotated at the same speed as the drive roller or at a different, usually lower or reduced speed. However, a simple and effective connection when the pump 18 is a centrifugal pump and to be driven at the same speed as the drive roller 19, is the illustrated direct drive in which the pump's impeller shaft 28 is axially aligned with the shaft 25 of the drive roller and the adjoining ends of the shafts are directly coupled by a driving connection in the form of a sleeve or like coupling receiving or fitting on and keyed to the shaft ends, with the shaft alignment maintained, as by journalling the pump shaft outwardly of the coupling in at least another of the bearings 26 fixed to and upstanding from the base plate 20 and, with the adjoining of the drive roller bearings, bracketing the coupling. As opposed to the mentioned other types of driving connections, the illustrated direct coupling, when feasible for the particular pump, not only requires no lateral offset of the pump relative to the drive roller but the vertical offset of the pump seat 22 relative to the main part 23 of the base plate 20 need only compensate for any otherwise difference in the heights or levels of the shafts 25 and 28 relative to the main part rather than accommodate any vertical component of the offsets of the pump and drive roller required for a driving connection of the gear or other indirect type.

When, as in the illustrated conveyor 1, the troughing pulley assemblies 7 through their mounting frames 15, are mounted on and supported by the side wire ropes 13 with their bottom pulleys 8 at a level below the ropes, the pump assembly 17 preferably is suspended from or supported by rather than on the wire ropes and, given sufficient surface contact therewith, the connectors 21 can be hooked or clipped on or over the wire ropes rather than clamped thereto and depend on the weight of the assembly to hold them in place. Whatever their form, the connectors preferably are adapted not only to releasably mount the pump assembly 17 in any selected position longitudinally of the wire ropes 13 but to enable the drive roller 19 to be adjusted vertically or in height or level relative to the overlying part of the advance flight 6 of the belt 3. Since the advance flight 6 of the belt 3 ordinarily will slope upwardly in its direction of travel regardless of where the pump assembly 17 is mounted, the bottom pulleys 8 of the adjoining troughing pulley assemblies 7 between which the pump assembly is mounted, will be on different levels and only by happenstance will the diameter of those pulleys and the drive roller be the same. The only meaningful comparison of the levels of the drive roller 19 to the bottom rollers 8 of the adjoining pair thus is in terms of a plane, indicated in solid line in FIG. 5, tangential to the upper edges of the adjoining bottom pulleys and, relative thereto, the upper edge of the drive roller at its upper and lower levels will be respectively above and below or substantially in that plane. While, for belt speeds of from 350 to 600 ft./min. usual in coal mines, the diameter of the drive roller 19 may be from 3½ to 6 in., a diameter convenient for other calculations is about 4 in. at which the rotative speed of the drive pulley and linear speed of the belt 3 will be approximately the same, numerically.

Mounted at a selected longitudinal position along the conveyor 1 between an adjoining pair of the troughing pulley assemblies 7, with the drive roller 19 centered laterally on the advance flight 6 of the belt 3 and the pump 18 offset outwardly from the drive roller toward whichever side of the conveyor is the more convenient for the intended use, the pump assembly can be used for pumping water accumulated or collected in puddles or pools on the floor of the mine shaft in which the conveyor mounting the pump assembly is installed. In such case the pump 18 suitably may be a centrifugal pump having connected to its axial inlet a flexible suction hose or line 34 having on its inlet end a usually screened foot fitting 35 immersible in any puddle reachable by the hose. The pump's discharge hose or line 36, also usually flexible, may lead to a suitable discharge area which preferably will be outside the mine but, if the run thereto would be beyond the capacity of the particular pump, may be some more convenient or closer completely worked-out area inside the mine. In either such case the pump 18 ordinarily will be run continuously while the belt 3 is running by, as necessary, vertically adjusting the level of the drive roller 19 relative to the advance flight to the upper position shown in dot-and-dash line in FIG. 5, such that the drive roller and advance flight are in continuous driving engagement and the drive roller and therethrough the pump are continuously driven whenever the belt is running, regardless of whether the belt is running empty or loaded. If, as when all puddles of accumulated water within reach of the pump's suction line 34 have been drained, stopping of the pump for shifting to a different position on the same conveyor 1 or to another belt conveyor, simply entails loosening the connection between the connectors 21 and the base plate 20 to drop the drive roller 19 to a level at which it is disengaged from the advance flight 6 and releasing the connectors from the wire ropes 13 to free the pump assembly for removal to a selected position on the same or a different conveyor.

An alternative method of draining puddles of accumulated water for which the pump assembly 17 is equally adapted, is to so direct the pump's discharge line 36, suitably by a support rod 37 mounted on and upstanding from the pump seat 22 on the base plate 20, as to discharge water from the pump onto coal or other mined material on the advance flight 6. This method has the advantages of not only drastically reducing the length or run of the discharge line 36 by enabling the water discharged by the pump onto the advance flight 6 to be carried from that point by the advance flight with the mined material thereon to the conveyor's discharge end but also of wetting down the coal or other mined material on the advance flight for minimizing the dust released therefrom into ambient air in the vicinity of the conveyor. This method is usable only when the advance flight 6 is loaded, since otherwise water discharged thereonto would run back to and off the rear end of the conveyor, thus nullifying any benefit from the pumping. With the pump assembly 17, discharge of water from the pump 18 only when the belt 3 is loaded with mined material, is rendered both feasible and automatic by vertically adjusting the level of the drive roller 19 relative to the advance flight 6 to a position in which the roller's upper edge is substantially in the plane, indicated in solid line in FIG. 5, that is tangential to the upper edges of the bottom pulleys 8 of the adjoining pair of troughing assemblies 7, so that, as are the bottom pulleys, the drive roller is drivably engaged by the bottom of the trough 10 in the advance flight when that flight is loaded but disengaged therefrom by upward retraction of the trough under the pull of the head roller 4 and the belt's own resilience when the belt is running empty.

Figure 6:
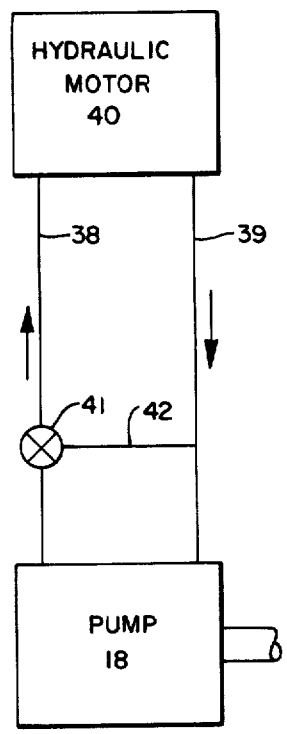
FIG. 6 is a schematic view of the pump of the pump assembly fluid-connected to a hydraulic motor for hydraulically driving or powering therethrough in-mine equipment.

Aside from its use in either of the above ways for pumping accumulated water from an underground mine, the pump assembly 17 is adaptable for use in driving or powering hydraulically practically any auxiliary equipment used in an underground mine that is conventionally electrically driven or powered. For such use, the pump 18 drivably connected to the drive roller 19 may be any type of rotary pump adapted to transmit power hydraulically to a hydraulic motor and, instead of the open-ended lines 34 and 36 used for pumping water, the lines connected to the inlet and outlet sides of the pump will, as shown in FIG. 6, be return and feed lines 38 and 39 connected respectively to outlet and inlet sides of the hydraulic motor indicated at 40. As usual in hydraulic pump-motor units, the hydraulic fluid transmitted between the pump 18 and motor 40 through the lines 38 and 39 ordinarily will be oil of suitable viscosity and, as opposed to the pump, the motor may be either a rotary or reciprocating motor as best suits the equipment it is to drive or power.

Figure 5:
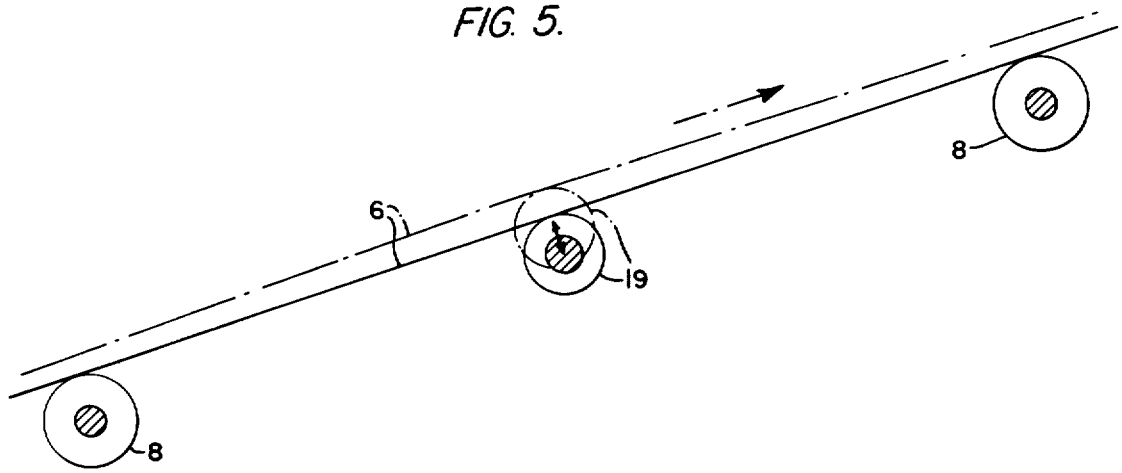
FIG. 5 is a somewhat schematic view showing the positions of the drive roller of the pump assembly relative to the bottom pulleys of the adjoining troughing pulley assemblies in drivably engaging a loaded and empty belt.

When adapted by the inclusion as the pump 18 of a suitable rotary pump and the addition of the hydraulic motor 40 fluid-connected to the pump for hydraulically driving or powering in-mine equipment, the drive roller 19 preferably will be continuously driven by vertically adjusting the position of the drive roller to a level, indicated in dot-and-dash in FIG. 5, at which it is continuously drivably engaged by the return flight 6 and under a sufficient pressure to inhibit slippage therebetween, if necessary by slightly humping the return flight by the drive roller between the adjoining pair of troughing pulley assemblies 7. Although, as a consequence, the pump 18 will be continuously driven whenever the belt 3 is running and can supply like continuous power to the hydraulic motor 40, that power is interruptible whenever desired, as by suitable valving 41, for temporarily circulating hydraulic fluid between the pump and a bypass line 42 connecting the lines 38 and 39 in advance of and bypassing the motor.

From the above detailed description, it will be apparent that there has been provided a belt conveyor drive system for underground mines which, as opposed to the use of relatively expensive and hazardous electric power, for electrically driving equipment in underground mines enables water pumps and other in-mine equipment to be driven mechanically or hydraulically by power taken either continuously or intermittently off the advance flight of a belt conveyor. It should be understood that the described and disclosed embodiment is merely exemplary of the invention and that all modifications are intended to be included that do not depart from the spirit of the invention and the scope of the appended claims.

Having now described my invention, I claim:

1. In a belt conveyor drive system for underground mines, the combination with a conveyor including an endless belt riding at opposite ends of the conveyor on head and tail rollers and having vertically spaced advance and return flights, whereof the advance flight rides between the head and tail rollers on longitudinally spaced pulley assemblies supported at sides on side members extending substantially the length of the conveyor, of a pump assembly comprising a drive roller drivable off the advance flight, a pump drivably connected to said drive roller, a base mounting said drive roller and pump, and connector means connected to said base for releasably mounting said pump assembly in any selected operative position longitudinally of the conveyor.

2. A drive system according to claim 1, wherein the drive roller is drivably engageable with the advance flight, the connector means in mounting the pump assembly in operative position are connected to the side members of the conveyor and include means for vertically adjusting the base relative to the side members and therethrough the driving engagement of the drive roller with the advance flight.

3. A drive system according to claim 2, wherein the pulley assemblies are troughing pulley assemblies, and the pump assembly in selected operative position is mounted between an adjoining pair of said troughing pulley assemblies with the drive roller below and substantially centered laterally on the advance flight of the belt.

4. A drive system according to claim 3, wherein the drive roller is vertically adjustable between an upper position in which the drive roller is continuously drivably engaged and driven by the advance flight while the belt is running whether running loaded or empty and a lower position in which the drive roller is drivably engaged and driven by the advance flight only when the belt is running loaded.

5. A drive system according to claim 4, wherein the pump is a suction pump for draining through a suction line water accumulated in the mine in the vicinity of the belt conveyor mounting the pump assembly.

6. A drive system according to claim 5, wherein the pump has a discharge line for directing water discharged by the pump to a selected discharge area removed from the conveyor and in the operative position of the pump assembly the drive roller is in the upper position thereof for continuously driving the pump while the belt is running.

7. A drive system according to claim 5, wherein a discharge line of the pump is directed to discharge water from the pump onto mined material on the advance flight and the pump in an operative position of the pump assembly is driven automatically only when the belt is loaded with said mined material by positioning the drive roller in said lower position thereof relative to the advance flight.

8. A drive system according to claim 4, including hydraulic motor means fluid-connected to and forming with the pump hydraulic drive means for hydraulically powering in-mine equipment by power mechanically transmitted from the advance flight to the pump through the drive roller.

9. A drive system according to claim 8, wherein the pump in an operative position of the pump assembly is continuously driven while the belt is running by positioning the drive roller in the upper position thereof for continuous driving engagement with the advance flight, and including means in the fluid connection between the pump and hydraulic motor means for interrupting as desired the operation of the motor means.

10. A drive system according to claim 2, wherein the side members supporting the pulley assemblies for the advance flight of the belt are wire ropes, and the pump assembly in operative position is supported by said wire ropes.

11. A drive system according to claim 2, wherein the pump assembly is insertible from a side into the conveyor between and transversely of the advance and return flights, the pump is offset outwardly from the drive roller toward an end of the base, and the pump is alternately positionable on opposite sides of the conveyor by reversal of the pump assembly to correspondingly position the pump relative to the drive roller.

12. A drive system according to claim 5, wherein the pump is a centrifugal pump, and shafts of the drive roller and pump are mounted in axial alignment in antifriction bearings on the base and directly coupled.

* * * * *